United States Patent Office 3,122,403
Patented Feb. 25, 1964

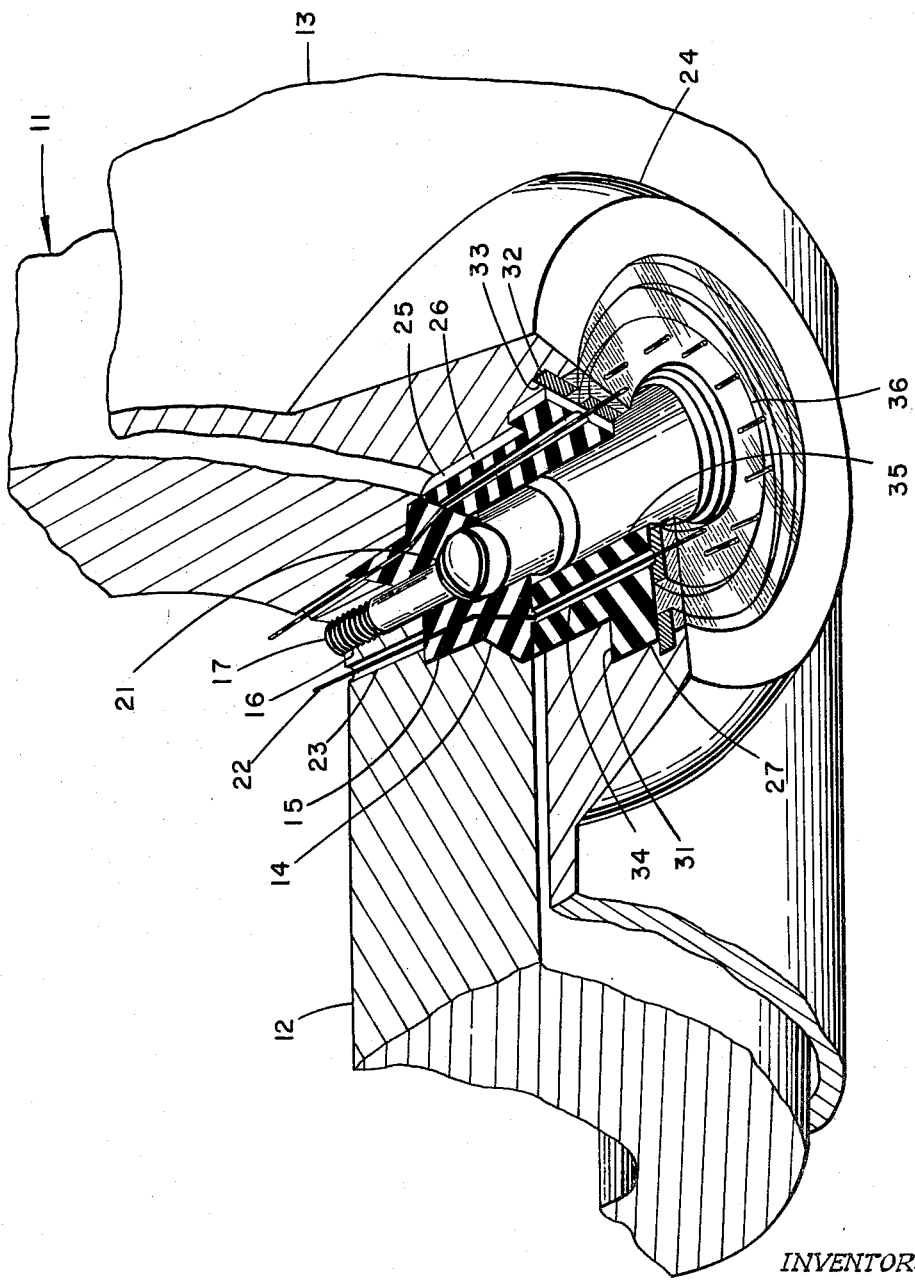

3,122,403
ELECTRICAL DISCONNECT
Carl L. McKee, West Covina, and Ronald T. Inglis, Mount Baldy, Calif., assignors to General Dynamics Corporation, San Diego, Calif., a corporation of Delaware
Filed Dec. 18, 1961, Ser. No. 160,008
1 Claim. (Cl. 339—45)

This invention relates to a missile umbilical disconnect device, and more particularly, to an umbilical disconnect between internal missile circuitry and external circuitry where the missile is launched from an expendable storage and launching tube.

Many small, rocket type missiles are stored and shipped in a container which is adapted to be employed subsequently as a launching tube. Electrical connections must be maintained between the missile and the launcher, as, exemplarily, between the rocket motor firing squib in the missile and the external electrical current source. More complex missiles, such as those with homing capability, may require many more connections between the launch tube and missile. Such circuit connections between the missile and launch tube must be severed when the missile is launched.

Various separable connectors have been developed to disconnect the missile from the launcher at the instant of launch. These separable connectors have generally been substantially similar to conventional multi-circuit connectors with the addition of a spring and latch mechanism triggered by launching of the missile. Such connectors have been bulky, heavy, complex and unreliable.

In contrast to heretofore known devices, the umbilical separation device of the present invention does not employ a separable plug and socket type of electrical connector. A plurality of electrical conductors are bonded to a rigid plug molded of a suitable insulating material secured to the outer wall of the missile. A cooperating second plug, also molded of a suitable rigid insulating material, is fixed to the wall of the launching tube. The wires pass through suitable apertures in the second plug. A clamp firmly holds the wires at the outer edge of the second plug. Relative movement between the missile and launching, as caused by firing of the missile, shears the wires at the interface between the first and second plugs.

As will be apparent the umbilical disconnect of the present invention eliminates many of the difficulties inherent in presently known devices. Exemplarily, the missile surface is aerodynamically clean, not having a protruding umbilical receptacle. No complex disconnect mechanism is necessary. Other conventional connector troubles, such as noise, are eliminated.

It is, therefore, an object of this invention to provide a missile umbilical disconnect device.

Another object of this invention is to provide an umbilical disconnect device which shears connecting wires as a missile is launched.

Another object of this invention is to provide an umbilical disconnect device leaving a streamlined aerodynamic surface on the missile after launching.

Another object of this invention is to provide an umbilical disconnect device which is simple, reliable, light in weight, introduces negligible aerodynamic drag, and is inexpensive to manufacture.

Other objects and advantages of this invention will become apparent from the following specification and appended drawing, wherein the sole figure illustrates, partially in section, the umbilical disconnect device of the present invention.

A missile 11 having a substantially cylindrical outer wall 12 is illustrated in a cylindrical launching tube 13. A plug 14 is recessed into a mating aperture 15 in the wall 12 of missile 11. As illustrated in the figure, the plug 14 does not extend entirely through the wall 12 of missile 11. A threaded aperture 16 cooperating with a headed bolt 17, extends from the bottom of mating aperture 15 to the inside of the wall 12 of missile 11. Plug 14 is furnished with a shoulder 21 cooperating with headed bolt 17, whereby plug 14 is secured to wall 12 of missile 11.

A plurality of electrical conductors, such as insulated copper wire 22, are connected at one end to electrical apparatus (not shown) in the interior of missile 11. Wire 22, exemplary of said plurality of wires, passes through a cylindrical duct 23 through the wall 12 of missile 11. Plug 14 is preferably molded about said wires, forming a unitary mass therewith, or the wires may be otherwise bonded to the walls of the passages through said plug.

Launching tube 13 is furnished with a boss 24 on the exterior thereof. Mounted in an aperture 25 in boss 24 is a second connector element 26. Connector element 26 is substantially cylindrical in shape, with a flange 27 adjacent the outer side of base 24. Flange 27 cooperates with shoulder 31, formed in the interior wall of aperture 25. A split circular ring clamp 32, inserted in groove 33 in the interior wall of base 24 retains the flange 27 of connector element 26 in contact with shoulder 31. A plurality of circularly arranged passages such as 34 are provided for conductors, such as wire 22, about a central aperture 35 in connector element 26. The conductors, such as wire 22, are tautly held by a suitably apertured clamping ring 36. Clamping ring 36 may conveniently be fabricated of a rubbery material retaining the conductors in position. A rigid synthetic plastic potting compound, preferably transparent, covers clamping ring 36, bonds the conductors, the outer portion of connector element 26, and split ring clamp 32, flush to the level of the outer edge of base 24. The potting compound serves to seal the apertures such as 34, and helps retain the conductors, such as wire 22, taut.

The conductors, such as wire 22, serve to supply power and various control signals to missile 11 from fixed equipment which may be connected to the launch tube. In like manner, signals indicating the operation of the missile mechanism may be transmitted over the wires through the plug to the launcher or to external instruments.

Relative movement between missile 11 and launcher tube 13 is induced by firing of a rocket motor in the missile, or by other suitable propellant forces. The resultant relative movement between connector sections 14 and 26 shears the conductors, such as wire 22. The conductors are firmly held by connector element 14 and clamping ring 36. The edges adjacent missile 11 of the passages in connector element 26 shear the conductors flush with the outer edge of connector section 14. Thus, wire 22 is sheared by the edge of passage 34 flush with the outer edge of connector section 14.

Although a presently preferred embodiment of this invention has been disclosed hereinabove, such description is intended to be illustrative only, and the true scope of the present invention is to be defined only by the appended claim.

We claim:

A disconnect for severing electrical connections between a missile and a tubular launcher comprising a first connector element of rigid synthetic plastic material having a plurality of electrical wires bonded therein, and extending outwardly therefrom, a threaded aperture in the outer wall of said missile, a headed bolt cooperating with said threaded aperture fastening said first connector element to the outer wall of said missile, said first connector element having an outer edge flush with the outer wall of said missile, a second connector element of rigid synthetic plastic material having a plurality of apertures for passage of said plurality of electrical wires, a boss on the outer wall of said tubular launcher adjacent said first connector element, a circular aperture in said boss, a shoulder in said circular aperture, a flange on said second connector element, a groove in the end of said circular aperture opposite said missile, a split ring clamp seating in said groove and securing said second connector element in said launcher tube boss aperture with said flange in contact with said shoulder, and the inner edge of said second connector element in contact with the outer edge of said first connector element, and synthetic plastic potting compound and a clamping ring adjacent said second connector element opposite said first connector element for protecting and tautly securing said plurality of wires whereby sliding motion between said first and second connector elements simultaneously shears said plurality of wires flush with the outer wall of said missile.

References Cited in the file of this patent

UNITED STATES PATENTS

| | | |
|---|---|---|
| 2,458,464 | Busacker et al. | Jan. 4, 1949 |
| 2,632,788 | Ustin | Mar. 24, 1953 |
| 2,940,362 | Paxton | June 14, 1960 |
| 2,951,421 | Katzen | Sept. 6, 1960 |
| 3,003,045 | Tichenor | Oct. 3, 1961 |
| 3,025,487 | Hennessey | Mar. 13, 1962 |